US010294997B2

(12) United States Patent
Lu (10) Patent No.: US 10,294,997 B2
(45) Date of Patent: May 21, 2019

(54) METHOD OF STAKING A DAMPER FLANGE TO A DAMPER HUB (71) Applicant: Schaeffler Technologies AG & Co. KG, Herzogenaurach (DE)

(72) Inventor: Phong Lu, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 228 days.

(21) Appl. No.: 15/264,308

(22) Filed: Sep. 13, 2016

(65) Prior Publication Data
US 2018/0073570 A1 Mar. 15, 2018

(51) Int. Cl.
*F16D 1/08* (2006.01)
*F16F 15/10* (2006.01)
*F16D 13/64* (2006.01)

(52) U.S. Cl.
CPC ......... *F16D 13/646* (2013.01); *F16D 1/0858* (2013.01); *F16F 15/10* (2013.01); *F16D 2300/12* (2013.01); *F16D 2300/22* (2013.01)

(58) Field of Classification Search
CPC ...... F16D 13/646; F16D 13/644; F16D 13/64; F16D 1/0858; F16D 2300/12; F16D 2300/22; F16F 15/10
See application file for complete search history.

(56) References Cited

U.S. PATENT DOCUMENTS

2009/0266665 A1 10/2009 Huegel et al.
2015/0316125 A1* 11/2015 Maienschein ....... F16F 15/1397
74/574.2
2016/0025154 A1 1/2016 Lu

FOREIGN PATENT DOCUMENTS

GB 2118273 A * 10/1983 ........... F16D 13/646

* cited by examiner

*Primary Examiner* — Jacob S. Scott
*Assistant Examiner* — Lillian T Nguyen
(74) *Attorney, Agent, or Firm* — Davidson, Davidson & Kappel, LLC (57) ABSTRACT A method of forming a damper assembly for a motor vehicle drive train is provided. The method includes staking a damper flange including a splined inner circumferential surface onto a damper hub to form a first rotational connection between the damper flange and damper hub; and forming a second rotational connection between a radially projecting protrusion of the damper hub and the damper flange. A damper assembly is also provided that includes a damper flange including a splined inner circumferential surface; and a damper hub including an outer circumferential surface staked to the splined inner circumferential surface of damper flange forming a first rotational connection between the damper flange and damper hub. The damper hub includes a radially projecting protrusion fixed to the damper flange forming a second rotational connection between the damper flange and the damper hub.

12 Claims, 7 Drawing Sheets

Fig. 8 ial lengths and/or axial thicknesses, this method,
METHOD OF STAKING A DAMPER FLANGE TO A DAMPER HUB The present disclosure relates generally to damper assemblies and more specifically to methods for fixing damper flanges to damper hubs.

BACKGROUND

Figure 1A:
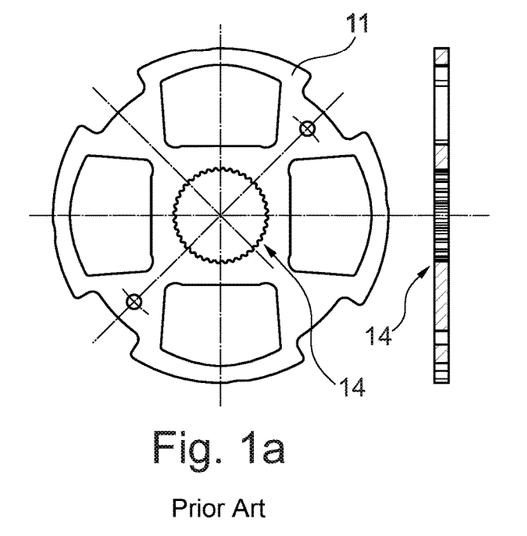
FIGS. 1a to 1c show views illustrating a conventional method of forming a damper assembly by staking a damper flange onto a damper hub.
Figure 1B:
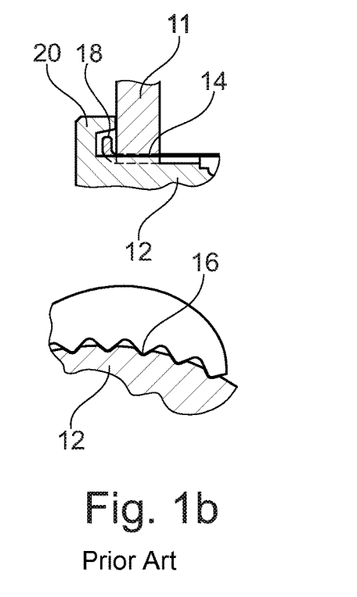
Figure 1C:
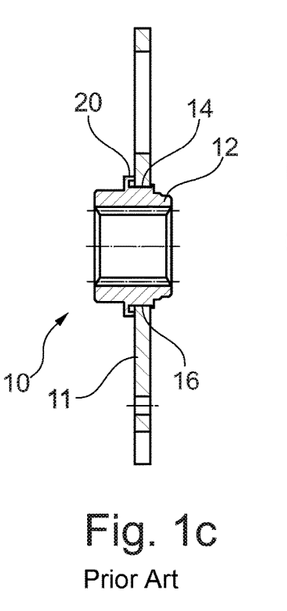

FIGS. 1a to 1c show a conventional method of forming a damper assembly 10, specifically forming a flange-hub sub-assembly of damper assembly 10 formed by staking a damper flange 11 onto a damper hub 12. Damper hub 12 is formed of a forging material and damper flange 11 is formed of a case hardened stamped flange for forging damper hub 12. As damper flange 11 is pressed onto damper 12, an inner circumferential splined surface 14 of damper flange 11 spline cuts an outer circumferential surface 16, displacing material 18 (i.e., creating chips), of outer circumferential surface 16 of damper hub 12. Damper hub 12 is provided with a chip pocket 20 at outer circumferential surface 16 to receive displaced material 18. Following the storage of displaced material 18 in pocket 20, damper hub 12 is staked or coined to fix damper flange 11 axially on damper hub 12.

U.S. Pub. 2009/0266665 discloses a hub in which, radially at the inside, an end of a transmission input shaft is arranged in a rotatable fashion and on which, radially at the outside, a piston of a converter bypass clutch is mounted axially movable and rotatable; the hub may be caulked with the converter cover.

Figure 2:
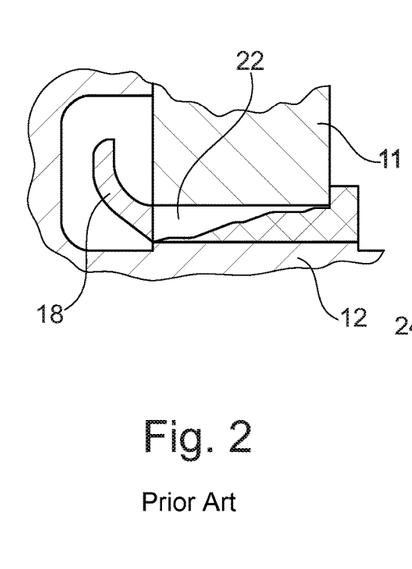
FIG. 2 shows a partial cross-sectional side view illustrating gaps that may be left in between the splines of the flange and the outer circumference of the hub in a known method.

U.S. Pub. 2016/0025154 discloses another method of fixing a damper flange to a damper hub. For splines having large radial lengths and/or axial thicknesses, this method, and the method of FIGS. 1a to 1c, may result in gaps 22 being left in between the splines of flange 11 and the outer circumference of hub 12, as shown in FIG. 2, impacting the torque transmission ability of the damper assembly.

Figure 3:
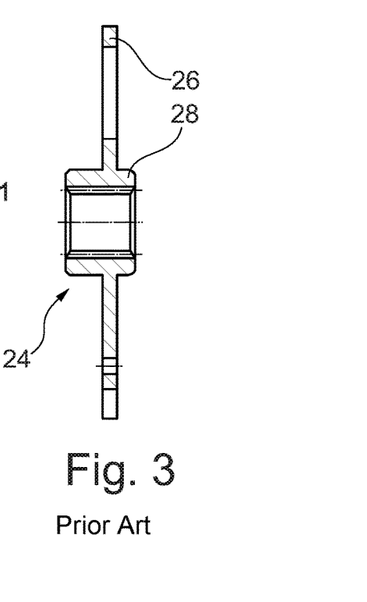
FIG. 3 shows a cross-sectional side view of a conventional damper sub-assembly.

FIG. 3 shows a damper sub-assembly 24 including a damper flange 26 and a damper hub 28 integrally formed together in a one-piece design that typically requires more processing (machining and stamping) than damper assembly 10 and is typically more costly than the hub design 10.

SUMMARY OF THE INVENTION

A method of forming a damper assembly for a motor vehicle drive train is provided. The method includes staking a damper flange including a splined inner circumferential surface onto a damper hub to form a first rotational connection between the damper flange and damper hub; and forming a second rotational connection between a radially projecting protrusion of the damper hub and the damper flange.

A damper assembly is also provided that includes a damper flange including a splined inner circumferential surface; and a damper hub including an outer circumferential surface staked to the splined inner circumferential surface of damper flange forming a first rotational connection between the damper flange and damper hub. The damper hub includes a radially projecting protrusion fixed to the damper flange forming a second rotational connection between the damper flange and the damper hub.

BRIEF DESCRIPTION OF THE DRAWINGS

The present invention is described below by reference to the following drawings, in which.

DETAILED DESCRIPTION

The disclosure provides a method of fixing a damper flange to a damper hub such that torque transmitting capacity is increased while also providing more axial bending robustness for an oscillation loading application. Serrations of the hub are machined larger than the spline serrations under staking pressure fitting the hub to the flange. Coining is used to fill the spline spaces between the spline and the hub by tangential form fitting. More contact area may result in increased torque transmitting capacity.

Figure 4A:
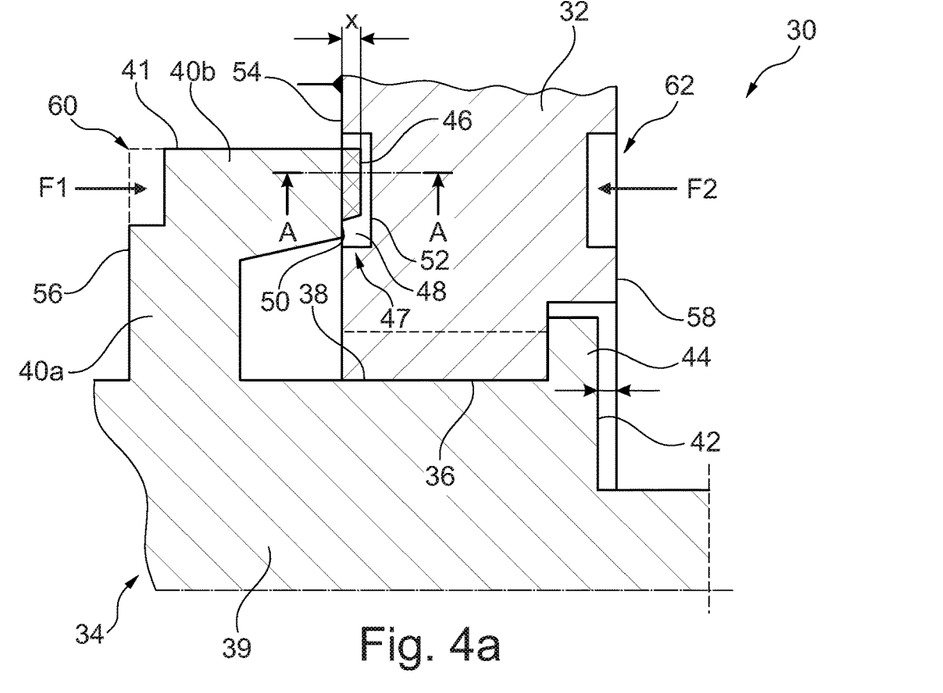
FIGS. 4a to 4c illustrate a method of forming a damper assembly for a torque converter in accordance with a first embodiment of the present invention.

FIGS. 4a to 4c illustrate a method of forming a damper assembly 30 for a torque converter in accordance with a first embodiment of the present invention. FIG. 4a shows a partial cross-sectional side view of damper assembly 30, illustrating an inner diameter of a damper flange 32 being staked onto an outer diameter of a damper hub 34 to form a rotational connection between flange 32 and hub 34. Damper hub includes a cylindrical base 39 and radially projecting protrusion 40 forming a pocket on an outer circumferential surface 38 of base 39. Damper hub 34 is formed of a forging material and damper flange 32 is formed of a case hardened stamped flange for forging damper hub 34. As damper flange 32 is pressed onto damper 34, an inner circumferential splined surface 36 of damper flange 32 spline cuts outer circumferential surface 38 of base 39 of damper hub 34, which displaces material of base 39 into the chip pocket of hub 34 at outer circumferential surface 38 to receive the displaced material in the manner as shown in FIGS. 1b and 2. Protrusion 40 includes a radially extending section 40a protruding radially outward from outer circumferential surface 38 and an axially extending section 40b, whose outer circumferential surface 41 defines an outer diameter of protrusion 40, extending axially from a radially outer end of radially extending section 40a. Following the storage of the displaced material in protrusion 40, base 39 of damper hub 34 is staked or coined at a radially extending surface 42 of hub 34 to form a radially extending lip 44 fixing damper flange 32 axially on damper hub 34. An inner diameter end of flange 32 is fixed axially between lip 44 and protrusion 40.

Figures 4B, 4C:
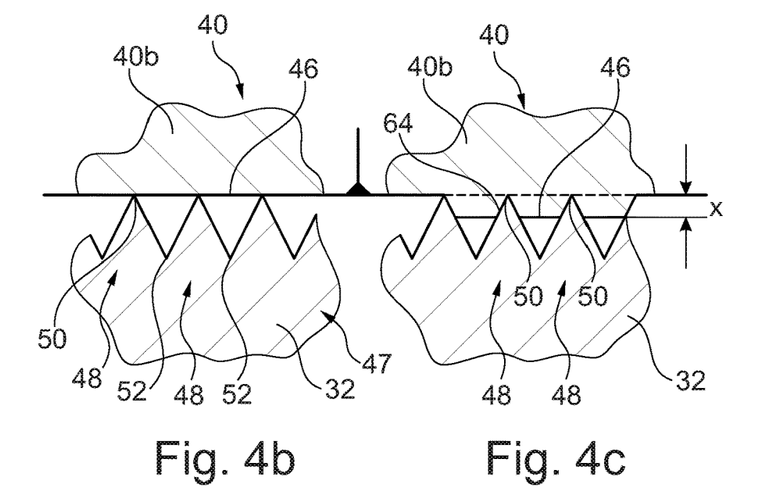

After lip 44 is formed, protrusion 40 is forced axially into flange 32 such that protrusion 40 is rotationally engaged with protrusion 40 to provide further torque transmitting capability for damper assembly 30. FIGS. 4b and 4c illustrate views of protrusion 40 and flange 32 along A-A in FIG. 4a before and after protrusion 40 is rotationally engaged with flange 32. As shown in FIG. 4b, which is a view along A-A in FIG. 4a after lip 44 is formed but before protrusion 40 is forced axially into flange 32, a flange facing radially extending surface 46 of axially extending section 40b of protrusion 40 is aligned in contact with a serrated portion 47 of flange 32. Serrated portion 47 includes a plurality of serrations 48. Each serration 48 is defined by a peak 50 and two valleys 52, with each peak 50 being circumferentially separated from the adjacent peaks 50 by respective valleys 52. Accordingly, peaks 50 and valleys 52 extend radially parallel to each other such that serrations 48 are radially aligned. Serrated portion 47 is formed in a flange facing radially extending surface 54 of flange 32 on a pocket facing side of flange 32. After lip 44 is formed by the coining of surface 42, peaks 50 of serrations 48 contact radially extending surface 46.

Then, a radially extending surface 56 of protrusion 40 that faces away from flange 32 is coined with a force F1 at the same time a radially extending surface 58 of an axial side of flange 32 facing away from protrusion 40 is coined with a force F2, forming an indentation 60 in protrusion 40 and an indentation 62 in radially extending surface 58, while forcing peaks 50 of serrations 48 to penetrate into radially extending surface 46 of protrusion 40, as shown in FIGS. 4a and 4c, by a distance X1. Serrations 48 form radially extending indentations 64 in radially extending surface 46 of protrusion 40, as shown in FIG. 4c. At least a portion of serrations 48 are thus engaged in protrusion 40 of hub 34 to provide an additional rotational connection between hub 34 and flange 32.

Figure 5A:
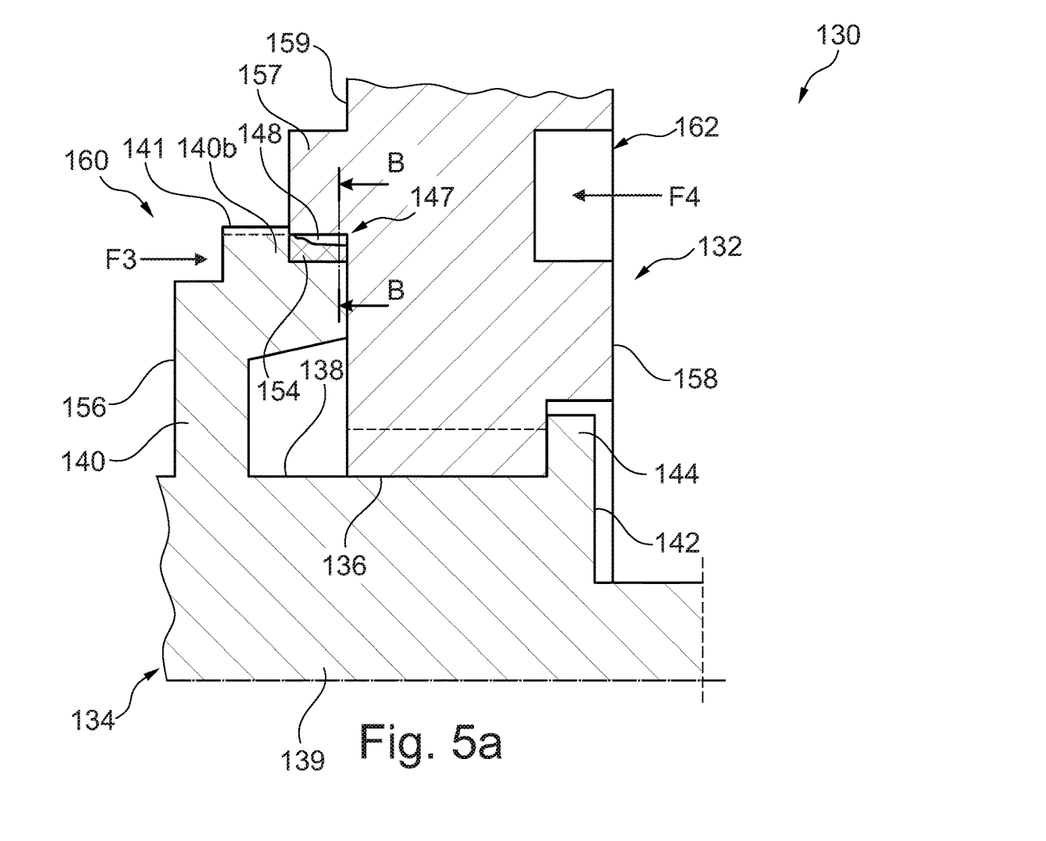
FIGS. 5a and 5b illustrate a method of forming a damper assembly for a torque converter in accordance with a second embodiment of the present invention.

FIGS. 5a and 5b illustrate a method of forming a damper assembly 130 for a torque converter in accordance with a second embodiment of the present invention. FIG. 5a shows a partial cross-sectional side view of damper assembly 130, illustrating an inner diameter of a damper flange 132 being staked onto an outer diameter of a damper hub 134 to form a rotational connection between flange 132 and hub 134. Damper hub 134 includes a cylindrical base 139 and a radially projecting protrusion 140 forming a pocket on an outer circumferential surface 138 of base 139. Damper hub 134 is formed of a forging material and damper flange 132 is formed of a case hardened stamped flange for forging damper hub 134. As damper flange 132 is pressed onto damper 134, an inner circumferential splined surface 136 of damper flange 132 spline cuts outer circumferential surface 138 of base 139 of damper hub 134, which displaces material of base 139 into the chip pocket of hub 134 at outer circumferential surface 138 to receive the displaced material in the manner as shown in FIGS. 1b and 2. Protrusion 140 includes a radially extending section 140a protruding radially outward from outer circumferential surface 38 and an axially extending section 140b, whose outer circumferential surface 141 defines an outer diameter of protrusion 140, extending axially from a radially outer end of radially extending section 140a. Following the storage of the displaced material in protrusion 140, base 139 of damper hub 134 is staked or coined at a radially extending surface 142 of hub 134 to form a radially extending lip 144 fixing damper flange 132 axially on damper hub 134. An inner diameter end of flange 132 is fixed axially between lip 144 and protrusion 140.

Figure 5B:
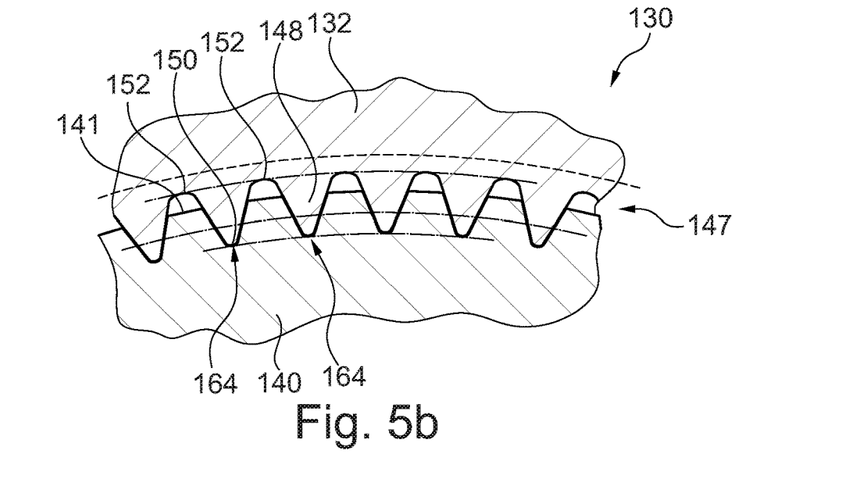

After lip 144 is formed, protrusion 140 is forced axially into flange 132 such that protrusion 140 is rotationally engaged with protrusion 140 to provide further torque transmitting capability for damper assembly 130. In contrast with the embodiment of FIGS. 4a to 4c, where the serrations are radially aligned, in the embodiment of FIGS. 5a and 5b flange 132 is provided with axially aligned serrations. FIG. 5b illustrate views of protrusion 140 and flange 132 along B-B in FIG. 5a after lip 144 is formed but before protrusion 140 is forced axially into flange 132 such that flange 132 is rotationally engaged with protrusion 140, outer circumferential surface 141 of axially extending section 140b of protrusion 140 is aligned in contact with a serrated portion 147 of flange 132. Serrated portion 147 includes a plurality of serrations 148. Each serration 148 is defined by a peak 150 and two valleys 152, with each peak 150 being circumferentially separated from the adjacent peaks 150 by respective valleys 152. Accordingly, peaks 150 and valleys 152 extend axially parallel to each other such that serrations 148 are axially aligned. Serrated portion 147 is formed in an axially extending inner circumferential surface 154 of an axial protrusion 157 of flange 132, which protrudes from a radially extending surface 159 on a pocket facing side of flange 132.

Then, a radially extending surface 156 of protrusion 140 that faces away from flange 132 is coined with a force F3 at the same time a radially extending surface 158 of an axial side of flange 132 facing away from protrusion 140 is coined with a force F4, forming an indentation 160 in protrusion 140 and an indentation 162 in radially extending surface 158, while forcing axially extending section 140b of protrusion 140 axially toward flange 132 and forcing serrated portion 147 of flange 132 toward protrusion 140. As a result of the forces F3, F4, serrations 148 slide axially along outer circumferential surface 141 of axially extending section 140b of protrusion 140 such that peaks 150 of serrations 148 penetrate into outer circumferential surface 141 of axially extending section 140b of protrusion 140, as shown in FIGS. 5a and 5b. Serrations 148 form axially extending indentations 164 in outer circumferential surface 141 of axially extending section 140b of protrusion 140, as shown in FIG. 5b. At least a portion of serrations 148 are thus engaged in protrusion 140 of hub 134 to provide an additional rotational connection between hub 134 and flange 132.

Figure 6:
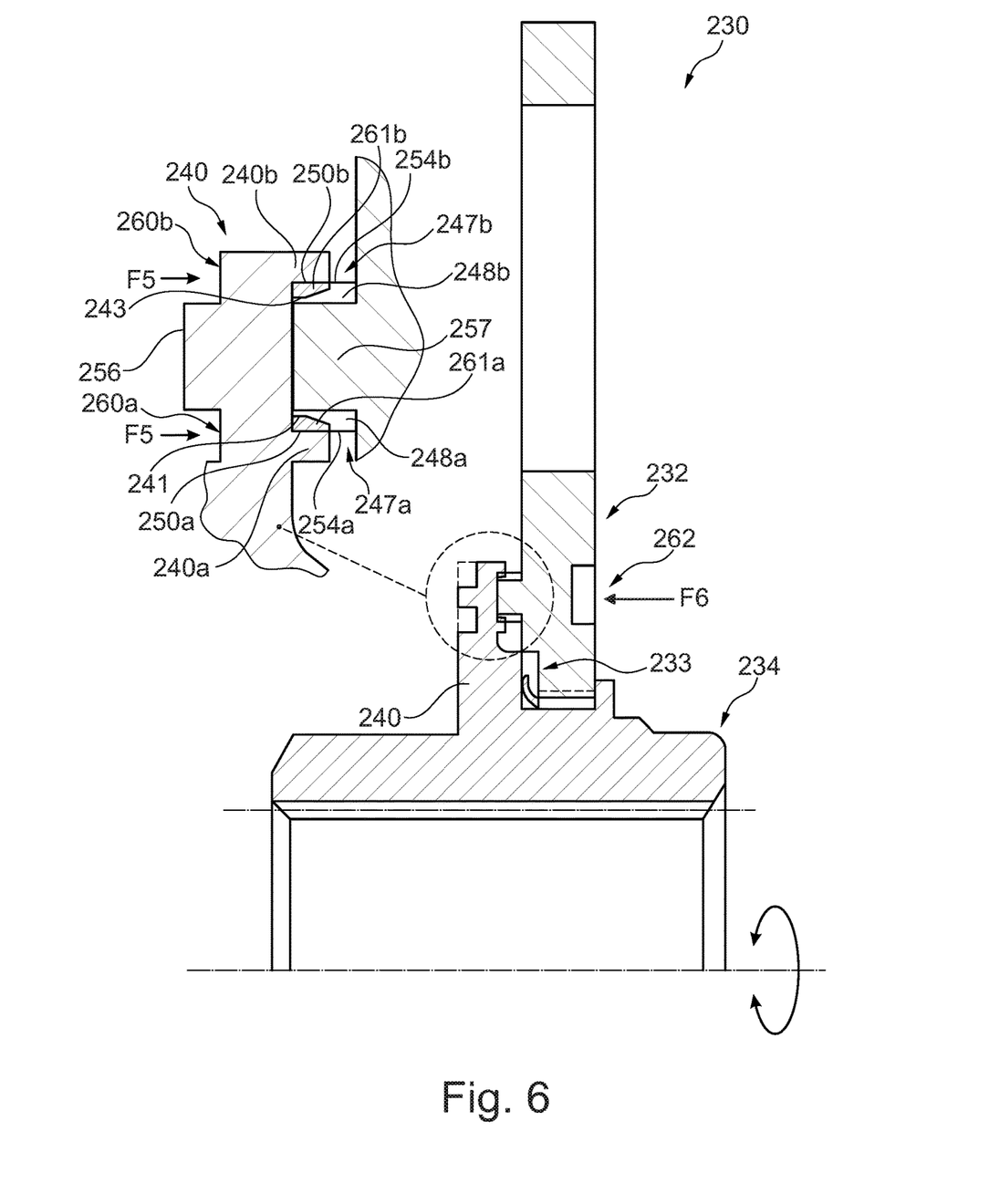
FIG. 6 illustrates a method of forming a damper assembly for a torque converter in accordance with a third embodiment of the present invention.

FIG. 6 illustrates a method of forming a damper assembly 230 for a torque converter in accordance with a third embodiment of the present invention. In this embodiment, flange 232 includes a groove 233 formed at the inner diameter thereof, which forms the chip pocket with a radially projecting protrusion 240. FIG. 6 shows a partial cross-sectional side view of damper assembly 230 formed in a similar manner as damper assembly 130 in FIGS. 5a, 5b, but with an axial protrusion 257 of a flange 232 including two serrated portions—a first serrated portion 247a formed in an axially extending inner circumferential surface 254a of axial protrusion 257 and a second serrated portion 247b formed in an axially extending outer circumferential surface 254b of axial protrusion 257. Accordingly, when a radially extending surface 256 of a radially projecting protrusion 240 forming a pocket that faces away from flange 232 is coined at two different positions with a force F5 at the same time a radially extending surface 258 of an axial side of flange 232 facing away from protrusion 240 is coined with a force F6, forming indentations 260a, 260b in protrusion 240 and an indentation 262 in radially extending surface 258, two portions 261a, 261b of protrusion 240 are forced axially toward flange 232 and serrated portions 247a, 247b of flange 232 are both forced axially toward protrusion 240.

As a result of the forces F5, F6, serrations 248a of serrated portion 247a slide axially along an outer circumferential surface 241 of a radially inner axially extending section 240a of protrusion 240 while serrations 248b of serrated portion 247b slide axially along an inner circumferential surface 243 of a radially outer axially extending section 240b of protrusion 240 such that peaks 250a of serrations 248a penetrate into outer circumferential surface 241 of axially extending section 240b of protrusion 240 and peaks 250b of serrations 248b penetrate into inner circumferential surface 243 of axially extending section 240b of protrusion 240. Similar to the axially extending indentations 164 shown in FIG. 5b, serrations 248a form axially extending indentations in outer circumferential surface 241 of axially extending section 240b of protrusion 240 and serrations 248b form axially extending indentations in inner circumferential surface 243 of axially extending section 240b of protrusion 240. At least a portion of serrations 248a, 248b are thus engaged in protrusion 240 of hub 234 to provide additional rotational connections between hub 234 and flange 232.

FIGS. 7a to 7d illustrate a method of forming a damper assembly 330 for a torque converter in accordance with a fourth embodiment of the present invention. In this embodiment, flange 332 includes a groove 333 formed at the inner diameter thereof, which forms the chip pocket with a radially projecting protrusion 340. Damper flange 332 is staked on damper hub 334 in a similar manner as the first to third embodiments, by using an inner circumferential splined surface 336 of damper flange 332 to spline cut an outer circumferential surface 338 of a base 339 of damper hub 334, which displaces material of base 339 into the chip pocket of hub 334 at outer circumferential surface 338, then forming a lip 344 sandwiching the inner diameter end of flange 332 between lip 344 and protrusion 340.

Figure 7A:
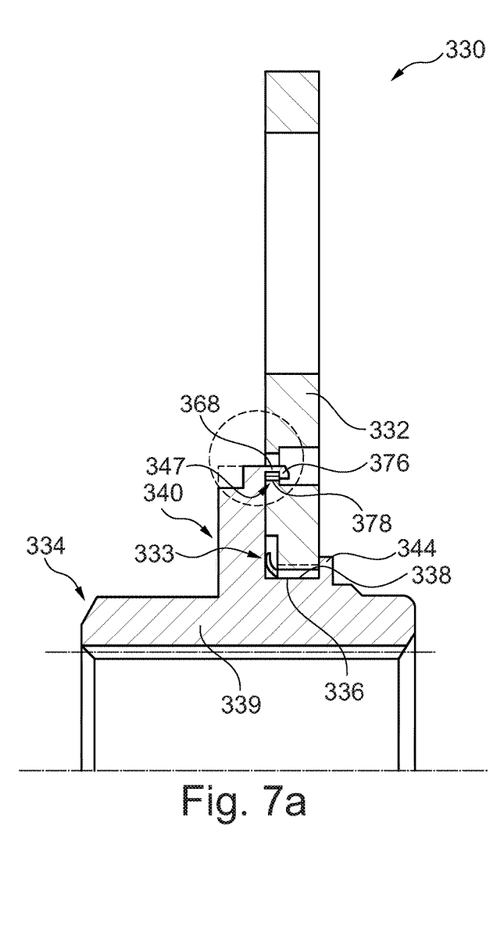
FIGS. 7a to 7d illustrate a method of forming a damper assembly for a torque converter in accordance with a fourth embodiment of the present invention.
Figure 7B:
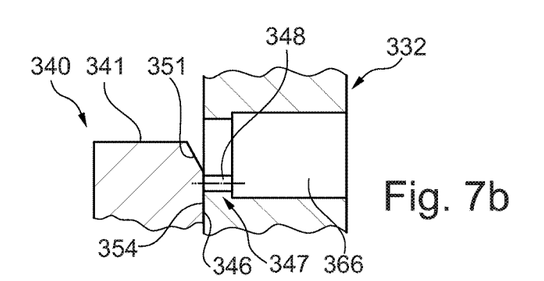
Figure 7C:
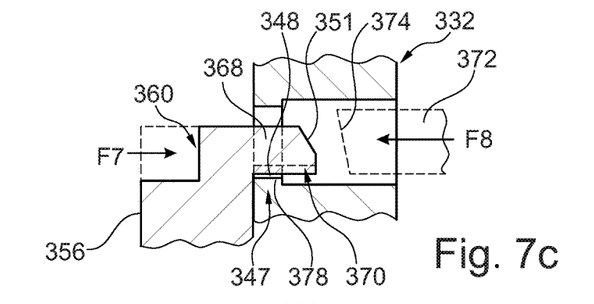
Figure 7D:
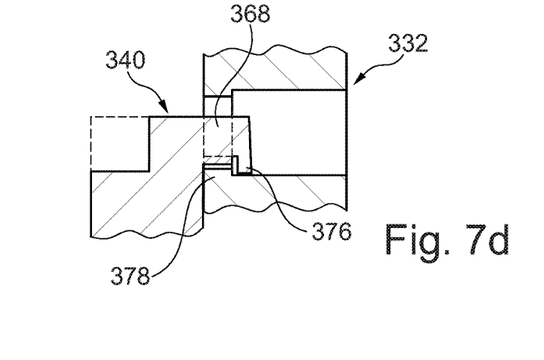

After lip 344 is formed, protrusion 340 is forced axially into flange 332 such that protrusion 340 is rotationally engaged with protrusion 340 to provide further torque transmitting capability for damper assembly 330. FIG. 7a shows a cross-sectional view of damper assembly 330 after protrusion 340 is rotationally engaged with flange 332. FIGS. 7b to 7d illustrating the steps of forming the rotational engagement between protrusion 340 and flange 332. As shown in FIGS. 7a to 7d, damper flange 332 is provided with a through hole 366 passing from a first radially extending surface 354 thereof to a second radially extending surface 358 thereof. Starting at radially extending surface 354, hole 366 is provided with a serrated portion 347 on an axially extending inner circumferential surface 366a of hole 366. Serrated portion 347 includes a plurality of axially extending serrations 348.

As shown in FIG. 7b, after flange 332 is staked onto hub 334, a damper side radially extending surface 346 of protrusion 340 contacts radially extending surface 354 of flange 332 and a radially outer end of protrusion 340 extends radially past serrated portion 347 of flange 332. An angled surface 351 of protrusion 340 extends axially and radially away from surface 346 to join an outer circumferential surface 341 of protrusion 340. Next, as shown in FIG. 7c, a radially extending surface 356 of protrusion 340, which faces away from flange 332, is coined with a force F7 such that the outer radial end of protrusion 340 is forced through hole 366 in flange 332 to form an axially extending projection 368. As protrusion 340 is forced through holes 366, protrusion 340 is forced through serrated portion 347 such that serrations 348 cut grooves 370 into an inner surface of axially extending projection 368. Then, a punching tool 372 having an angled front surface 374 is forced against angled surface 351 of protrusion 340, to force an end of axially extending projection 368 radially inward to form a radially inward extending lip 376 contacting a radially extending wall 378 supporting serrated portion 347, as show in FIG. 7d. The engagement of serrated portion 347 and grooves 370 provides an additional rotational connection between hub 234 and flange 232.

Figure 8:
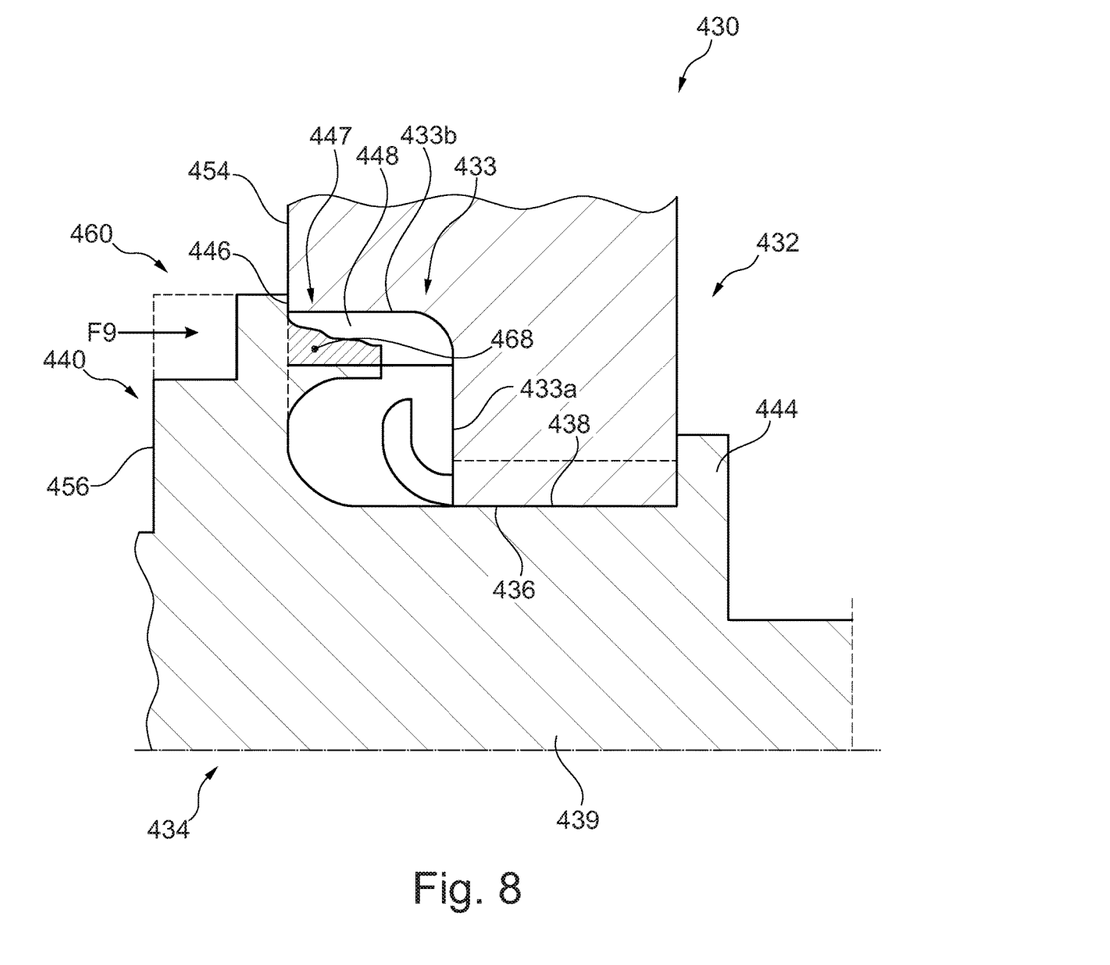
FIG. 8 illustrates a method of forming a damper assembly for a torque converter in accordance with a fifth embodiment of the present invention.

FIG. 8 illustrates a method of forming a damper assembly 430 for a torque converter in accordance with a fifth embodiment of the present invention. In this embodiment, flange 432 includes a groove 433 formed at the inner diameter thereof, which forms the chip pocket with a radially projecting protrusion 440. Damper flange 332 is staked on damper hub 334 in a similar manner as the first to fourth embodiments, by using an inner circumferential splined surface 436 of damper flange 432 to spline cut an outer circumferential surface 438 of a base 439 of damper hub 334, which displaces material of base 439 into the chip pocket of hub 434 at outer circumferential surface 438, then forming a lip 444 sandwiching the inner diameter end of flange 432 between lip 444 and protrusion 440.

After lip 444 is formed, protrusion 440 is forced axially into flange 432 such that protrusion 440 is rotationally engaged with protrusion 440 to provide further torque transmitting capability for damper assembly 430. Groove 433 is defined by a radially extending wall 433a extending from inner circumferential surface 436 and an axially extending wall 433b extending from the outer radial end of radially extending wall 433a. Axially extending wall 433b is provided with a serrated portion 447 including a plurality of axially extending serrations 448. After flange 432 is staked onto hub 434, a damper side radially extending surface 446 of protrusion 440 contacts radially extending surface 454 of flange 432. Next, a radially extending surface 456 of protrusion 440, which faces away from flange 432, is coined with a force F9, forming an indentation 460 in protrusion 440, while creating an axially extending projection 468 extending into groove 433 that mates with serrations 448. At least a portion of serrations 448 are thus engaged in projection 468 of protrusion 440 of hub 434 to provide an additional rotational connection between hub 434 and flange 432.

Figure 9A:
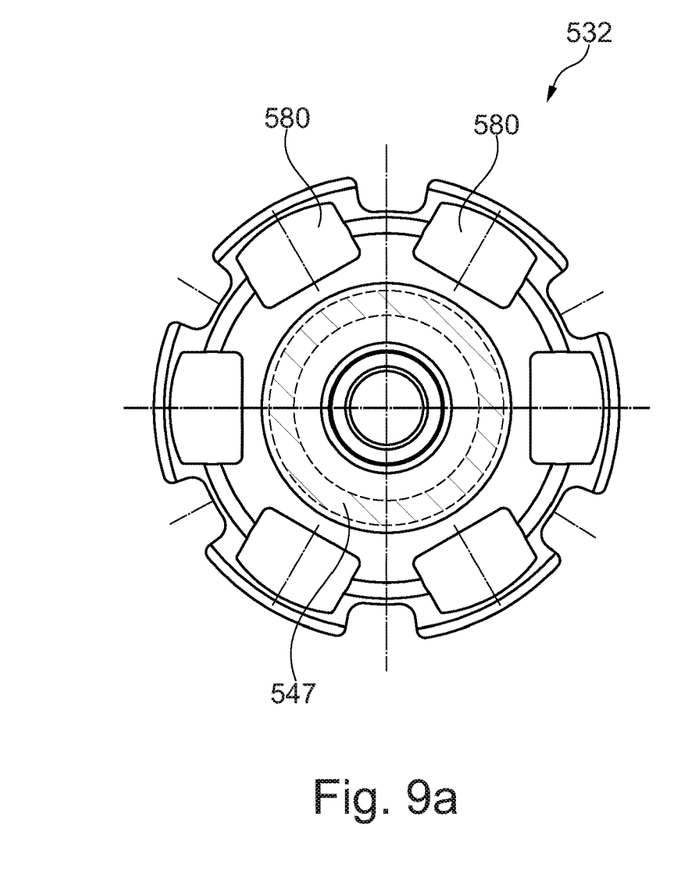
FIGS. 9a and 9b illustrate plan views of damper flanges that show where flanges include respective schematically shown serrated portions.
Figure 9B:
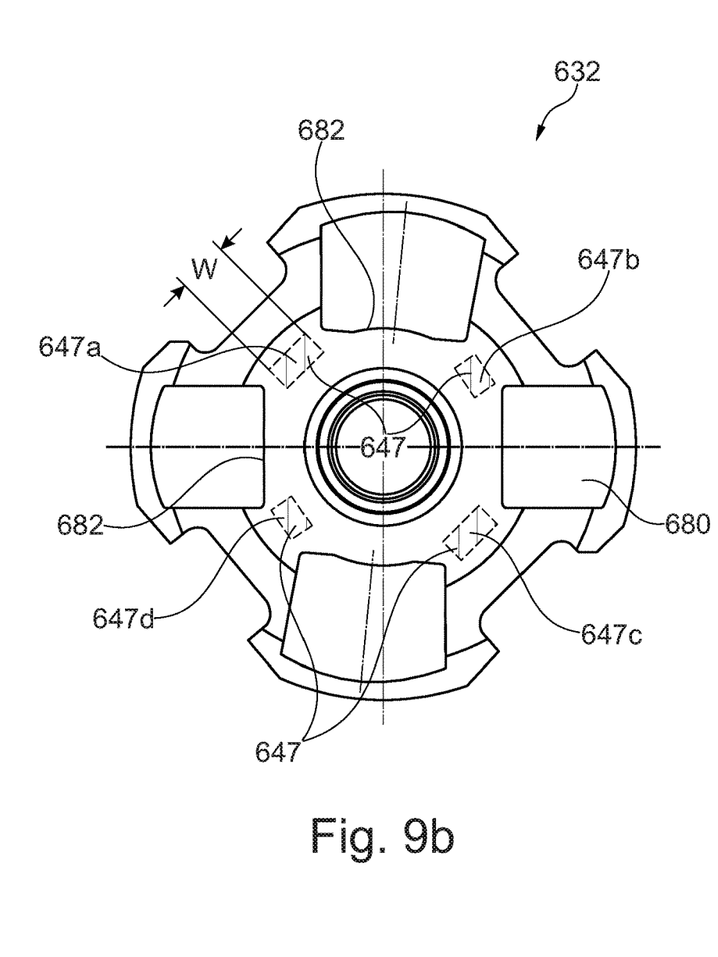

FIGS. 9a and 9b illustrate plan views of damper flanges 532, 632 that show where flanges 532, 632 may include respective schematically shown serrated portions 547, 647. Damper flange 532 shown in FIG. 9a includes a plurality of spring receiving slots 580, with serrated portion 547 being formed as a ring that is positioned radially inside slots 580. Damper flange 632 shown in FIG. 9b a plurality of spring receiving slots 680, with serrated portion 647 being formed by a plurality of distinct sections 647a, 647b, 647c, 647d, which each of 647a, 647b, 647c, 647d each circumferentially between two of slots 680 and radially aligned with radially inner edges 682 of slots 680. FIGS. 9a, 9b illustrate where the serrated portions of the first to fifth embodiments may formed in the flanges thereof.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A damper assembly for a motor vehicle drive train comprising:
    a damper flange including a splined inner circumferential surface; and
    a damper hub including an outer circumferential surface staked to the splined inner circumferential surface of the damper flange forming a first rotational connection between the damper flange and damper hub, the damper hub including a radially projecting protrusion fixed to the damper flange forming a second rotational connection between the damper flange and the damper hub.

2. The damper assembly as recited in claim 1 wherein the radially projecting protrusion of the damper hub forms at least portion of a chip receiving pocket receiving material of the damper hub displaced by the splined inner circumferential surface of the damper flange.

3. The damper assembly as recited in claim 1 wherein damper flange includes a serration portion including a plurality of serrations, the second rotation connection being formed by the serrations penetrating into the radially projecting protrusion.

4. The damper assembly as recited in claim 3 wherein serrations are radially aligned.

5. The damper assembly as recited in claim 4 wherein the serrations are axially aligned.

6. The damper assembly as recited in claim 3 wherein the damper flange includes a plurality of spring receiving slots, the serrated portion being ring-shaped and being radially inside of the spring receiving slots.

7. The damper assembly as recited in claim 3 wherein the damper flange includes a plurality of spring receiving slots, the serrated portion including a plurality of distinct sections, each of the distinct sections being circumferentially between two of the spring receiving slots.

8. The damper assembly as recited in claim 3 wherein an indentation is formed in the radially projecting protrusion.

9. The damper assembly as recited in claim 3 wherein the radially projecting protrusion includes a radially extending section protruding radially outward from the outer circumferential surface and an axially extending section extending axially from a radially outer end of the radially extending section.

10. The damper assembly as recited in claim 9 wherein an end of the axially extending section forms the second rotational connection between the damper flange and the damper hub.

11. The damper assembly as recited in claim 10 wherein the end of the axially extending section forming the second rotational connection between the damper flange and the damper hub contacts serrations of the damper flange.

12. The damper assembly as recited in claim 3 wherein the damper hub further includes a radially extending lip contacting the damper flange on an opposite side of the damper flange as the radially projecting protrusion.

* * * * *